Aug. 11, 1931.  O. G. HITCHCOCK  1,818,255
PIPE COUPLING
Filed Feb. 28, 1928
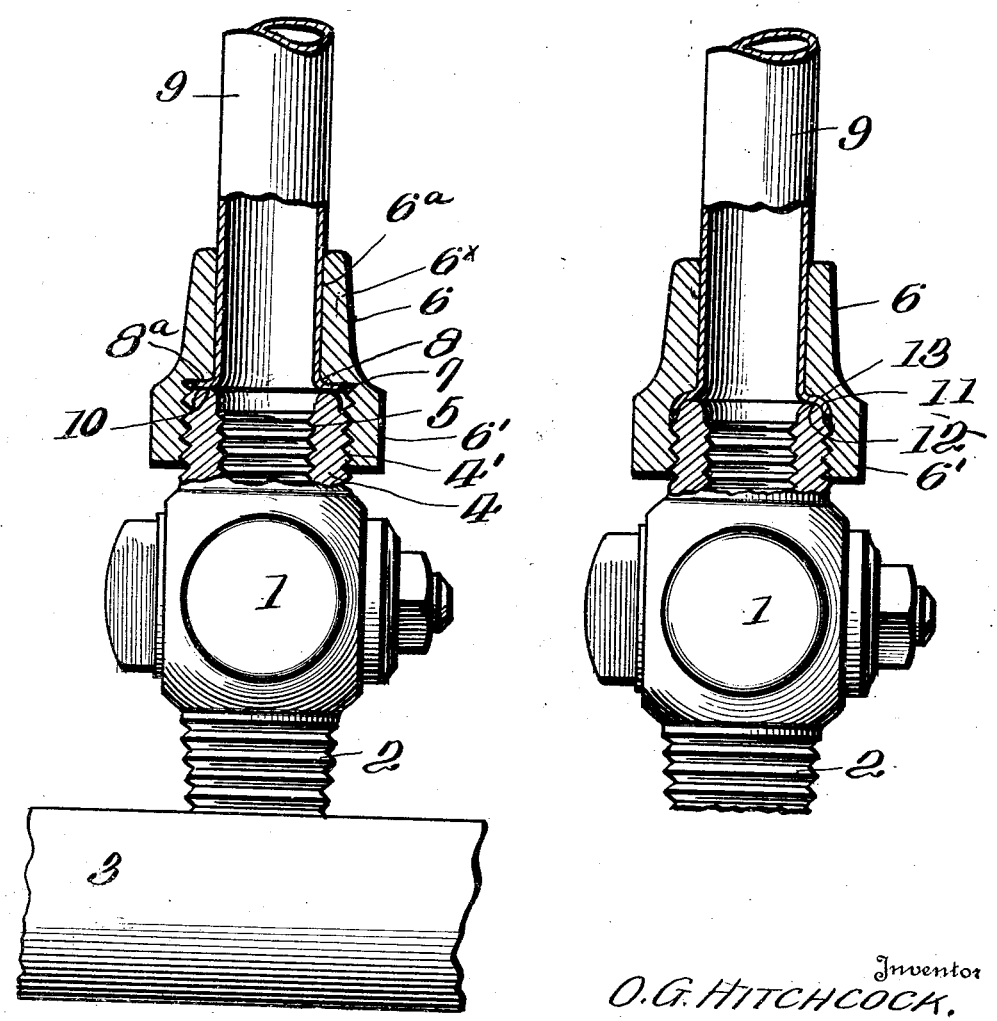
Inventor
O. G. HITCHCOCK.
By
Attorney Patented Aug. 11, 1931

1,818,255

UNITED STATES PATENT OFFICE

OTTO G. HITCHCOCK, OF ERIE, PENNSYLVANIA, ASSIGNOR TO HAYS MANUFACTURING CO., OF ERIE, PENNSYLVANIA, A CORPORATION OF PENNSYLVANIA

PIPE COUPLING

Application filed February 28, 1928. Serial No. 257,734.

This invention relates to improvements in pipe couplings, and especially to novel means for use in connecting copper tubing or the like to a standard or regular corporation stop or shut-off. Such stops and soft metal tubing are used for the purpose of transferring a liquid or any flowing fluid from a main or source of supply, to the point of consumption or final distributing point, as the case may be.

The invention is directed more particularly to specific means for providing simple and improved elements to permit a regular corporation stop or shut-off to be used for water main connections. The principal disadvantage of the joint heretofore designed and used, is that a special stop or fitting is necessary to receive the soft copper tubing connection.

Heretofore, efforts have been made to use connections which would stand a pulling strain equal or greater than the tubing itself. Such attempts, however, in the main, were unsuccessful, except by the design of complicated formed connections requiring special fittings and apparatus for forming the same.

The primary object of this invention is to provide simple and inexpensive means for connecting copper or other soft tubing to the main by the use of an ordinary corporation stop.

Due to the present invention, the standard main drilling and tapping machine, as well as all equipment such as tools, driving mandrels and the like, can be used to insert the fittings with copper connections, as is used to insert the present washer joint stop now in use.

With the foregoing considerations in mind, another object of the invention is to overcome the disadvantage now found in using special fittings and apparatus.

My invention consists broadly in combining with the standard corporation stop, copper tubing having a specially shaped end which is clamped against the outlet end of the stop by means of a special nut, and without the interposition of separate washers and the like.

With the foregoing objects outlined and with other objects in view which will appear as the description proceeds, my invention consists in the novel features hereinafter set forth in detail, illustrated in the accompanying drawings, and more particularly pointed out in the appended claims.

Referring to the drawings,

Figure 1 is an elevation of a water main and ordinary corporation stop connected thereto; the outlet end of the stop being in section, and shown connected to copper tubing or the like, by means of a special nut; and Figure 2 is a sectional view illustrating a modification.

In the drawings, 1 designates a standard or ordinary corporation stop or shut-off, which has threads 2 secured into a threaded opening in the main or supply pipe 3.

This stop has its outlet 4 provided with the usual standard external threads 4', and the usual internal threads 5.

The only portion of the corporation stop which I alter for the purposes of the present invention, is the extremity of the outlet, and this is shaped to form an annular abutment to facilitate the clamping of the copper tubing and to make a tight joint. In the present instance, this extremity is convex or semi-circular in cross section, so as to provide an annular abutment having a convex surface.

With this ordinary stop, I employ a special nut 6 which has standard threads formed in an internally threaded portion 6' at one end, and a smooth bored portion 6x at the opposite end, the bore 6A of which encircles the copper or other soft metal tubing 9. The nut is provided internally and intermediate its ends with an annular convex surface 8 which merges at one end into bore 6a, and at its other end into a horizontal shoulder 8A, which in turn merges into the threads of the nut.

In practicing the invention, one end of the tubing 9 is flanged as shown at 10, so as to conform to the surfaces 8 and 8A of the nut, and then when the nut is screwed up on to the stop, the convex extremity of the stop will engage the flange and clamp the same against the nut.

In the modification shown in Figure 2, I have constructed the parts so as to increase the bearing surface of the tubing on the nut and outlet end of the stop. In this instance, the nut is provided with a concavity 11 of annular formation, arranged directly opposite the annular convex surface 12 of the stop, and when the nut is screwed on the stop, the flanged end of the tubing is expanded around an annular convex surface 13 on the nut, and into the concavity 11, whereby the flange is bent into substantially S-shape in cross section.

From the foregoing, it is believed that the construction, operation and advantages of the invention may be readily understood by those skilled in the art, and I am aware that changes may be made in the details disclosed without departing from the spirit of the invention as expressed in the following claims.

What I claim and desire to secure by Letters Patent is:

1. In combination, a standard corporation stop having an externally threaded outlet, the extremity of which is provided with an annular convex surface substantially semi-circular in cross section, an internally threaded nut engaging the threads of the stop and provided with a tubular extension, said nut being provided intermediate its ends with an internal annular convex surface merging into a substantially right angled shoulder arranged opposite to the convexed extremity of the stop and a soft metal tubing extending through the tubular extension of the nut and having an annular substantially right angled flange clamped between said shoulder and said semi-circular extremity.

2. In combination, a pipe fitting having external threads on an end, the extreme edge of said fitting having an annular convex surface substantially semi-circular in cross section, an internally threaded nut threaded on said external threads, said nut having a tubular extension, said nut being provided intermediate its ends with an internal annular convex surface merging into a substantially right angled shoulder arranged opposite to the convex extremity of said pipe fitting, and a soft metal tube extending through the tubular extension of said nut, said tube having an annular substantially right angled plane flange clamped between said shoulder and said convexed extremity of said fitting.

In testimony whereof I hereunto affix my signature.

OTTO G. HITCHCOCK.